United States Patent [19]
Johnson et al.

[11] Patent Number: 5,917,500
[45] Date of Patent: Jun. 29, 1999

[54] INTELLECTUAL STRUCTURE FOR VISUALIZATION OF N-DIMENSIONAL SPACE UTILIZING A PARALLEL COORDINATE SYSTEM

[75] Inventors: Robert R. Johnson; Rodney D. Millar, both of Salt Lake City; Mark Palmer, West Valley City; Richard Anderson, Salt Lake City, all of Utah

[73] Assignee: N-Dimensional Visualization, LLC, Salt Lake City, Utah

[21] Appl. No.: 09/002,617

[22] Filed: Jan. 5, 1998

[51] Int. Cl.[6] ........................................ G06F 15/00
[52] U.S. Cl. ............................................... 345/440
[58] Field of Search ................................... 345/440, 441, 345/419, 421, 125

[56] References Cited

U.S. PATENT DOCUMENTS 5,426,729 6/1995 Parker ...................................... 345/441
5,457,775 10/1995 Johnson, Jr. et al. ................... 345/441

*Primary Examiner*—Phu K. Nguyen
*Attorney, Agent, or Firm*—Morriss Bateman O'Bryant & Compagni

[57] ABSTRACT

An intellectual structure for displaying multi-dimensional data which is represented as a computer generated model or plot of data space in parallel or non-orthogonal coordinates, wherein the data space is presented in a display space which facilitates relative motion of an observer with respect thereto. Accordingly, the essence of the invention is to create motion of the observer with respect to the data space because it significantly facilitates and enhances comprehension of relationships, structures, patterns or trends within the data space. This is accomplished by creating an n-dimensional data display utilizing parallel coordinates to view the resulting data space using observer-based motion.

21 Claims, 13 Drawing Sheets

INTELLECTUAL STRUCTURE FOR VISUALIZATION OF N-DIMENSIONAL SPACE UTILIZING A PARALLEL COORDINATE SYSTEM

BACKGROUND

1. The Field of the Invention.

This invention relates generally to the organization and understanding of data generated in multi-dimensional space. More specifically, it relates to the visualization of multi-dimensional data points plotted in a parallel coordinate system. This enables an observer to more readily identify relationships within that data by relative movement through and around those data points with the assistance of a computer and its output display.

2. The State of the Art

Problem solving in multi-dimensional space is an increasingly important field of research. For example, there are presently at least 45 University, 22 government, 11 commercial, and 5 military-based research centers devoted to studying and developing techniques and technologies for visualizing data plotted in multi-dimensional space. As would be expected, most of these efforts are directed at three-dimensional (3D) visualization of essentially 3D or two-dimensional (2D) data sets. These efforts include 3D plots, graphs and projections of data, as well as 3D animation. Some of these efforts include multi-dimensional data sets and 3D representations of the data. A few are known to even utilize the concept of parallel coordinate space in a limited number of dimensions.

It required an advance in science and art as great as the Renaissance to bring about the development of a true three dimensional visual perspective in art. Likewise, the reality of Euclidean geometry was upended with the development of Riemannian geometry which allowed for curved space and higher dimensional geometries. However, although Riemannian geometry ushered in the concept of the fourth dimension, it was not easily accepted because four-dimensional geometry could not be seen or visualized. It is noteworthy that Michio Kaku, an expert in the field of higher dimensional space and author of *HYPERSPACE: A SCIENTIFIC ODYSSEY THROUGH PARALLEL UNIVERSES, TIME WARPS, AND THE 10TH DIMENSION*, stated in 1994 that "[h]igher dimensional spaces are impossible to visualize; so it is futile even to try."

That the experts in the field of multi-dimensional space are in agreement that multi-dimensional space can not be visualized is not surprising. It is well known that we are unable to see more than three mutually perpendicular coordinates at the same time. Presently, the best that we can do is to utilize the techniques pioneered by Edwin A. Abbott and mathematicians Charles Hinton and later Thomas Banchoff. They developed the concept of using insights gained in one dimension to understand the next. In this context, the development of the Hypercube and Teseract enables us to see projections in three-dimensional space of four-dimensional orthogonal space objects. However, direct observations of the four-dimensional objects are still beyond our ability to visualize when using orthogonal representations. Efforts to overcome this inability have therefore focused on the development of computer graphics engines which can simulate higher dimensional geometry. See generally *Beyond the Third Dimension: Geometry, Computer Graphics and Higher Dimensions*, Thomas F. Banchoff, Scientific American Library, New York, 1996.

A recently developed technique for visualizing n-dimensional spaces utilizes a parallel coordinate system. FIG. 1 shows the conventional three-dimensional orthogonal (Cartesian) coordinate system and a point P1 plotted with respect to all three axes. FIG. 2 shows the same point in a parallel coordinate system where any number of dimensions (which is to be referred to hereinafter as "n" dimensions) are presently shown as separate and parallel axes perpendicular to a base axis in conventional 2D display or diagrammatic space.

In parallel coordinate space, the point P1 in conventional 3D coordinate space of FIG. 1 maps into a set of points (x1, y1, z1) as shown in FIG. 2. FIG. 2 is very typical of the Display Space representation used by Inselberg in that the set of points are now represented as a jagged line drawn so as to connect them. Disadvantageously, this diagrammatic convention adds jagged line clutter such as shown in FIG. 4. Moving visually with respect to the data space minimizes this clutter, but the lines connecting the data points are called "artifact" which have been added to facilitate visual correlation between the ordered data points.

Understanding the concept of artifact is central to understanding the benefits of the present invention. Therefore, separating what is shown in Display Space from what is shown in Data Space is important in visualization methodologies. Use of extra lines such as those showing correlation between particular data points (as done by Inselberg et al.), distance between coordinate axes, orientation (angle from or between) coordinate axes, color of those coordinate axes are all vital parameters for use (or for not being used) in Display Space. Additionally, each of these parameters in Display Space can be made a function of one or more of the coordinate values (or other values such as probability) in the Data Space.

In order to better visualize artifact, specific significance in the Display Space methodology used in the present invention is accorded the introduction of a "vertical" displacement of the values for each coordinate, shown in perspective view in FIG. 12A. This is in distinction from the displacement "along" the coordinate of the Data Space values as used by Inselberg et al. for the same data as shown in FIG. 12B. Inselberg's convention for showing coordinate values xi, for example, is to have each displacement xi shown as a distance along the coordinate rather than as a displacement "above" the coordinate as shown in FIG. 12A. In this convention, the constants d, k and h are all constants for any given display instance.

In Display Space as shown in FIG. 12B, the coordinate values (x1, x2, x3 . . . ; y1, y2, y3 . . . ; z1, z2, z3 . . . ; w1, w2, w3 . . . ; etc.) are shown in perspective and displaced vertically with respect to each coordinate axis by the distance h which is the actual (or normalized) height corresponding to each value xi, yi, etc. Each data point is separated from the previous data point by a common value d along the coordinate axes, x, y, z, w, etc.

This Display Space convention is quite different from that employed by Inselberg et al. in which the data points xi, yi, zi, wi, etc. are plotted on their coordinate axes at displacements along the axes that are proportional to their values xi, yi, zi, wi, etc., and as shown in FIG. 12B.

In addition, Inselberg et al. connect the data points (x1, y1, z1, w1, etc.), (x2, y2, z2, w2, etc.), (x3, y3, z3, w3, etc.), etc. with a display space line for each point in the parallel coordinates. Showing this correlation between points 1, 2, 3, . . . by use of lines connecting these points is sometimes useful, and it is usually confusing in both Inselberg's static views of his parallel coordinate spaces and in our dynamic views of parallel coordinate spaces. When using Inselberg's convention, artifact lines connecting the related points (x1, y1, z1, w1, etc.) are necessary in order to show which of the data points are those corresponding to a given single point in orthogonal space. In contrast with the convention used in the present invention, this relationship is self-evident to the viewer without the artifact of extra lines drawn in the diagram. Consequently, showing these data connecting lines, showing the coordinate axes themselves, or showing lines along the axes connecting the data points of each coordinate becomes a Display Space choice that can and should be made uniquely for each case study.

Therefore, it should be understood that connecting lines and the coordinate axes are display artifact. Artifact is any graphical construction used in Display Space that is not data point identification. Examples of display artifact or display space artifact are lines used to interconnect data points along the direction of coordinates, lines used to interconnect the several different values for a given data point (xi, yi, zi, wi, etc.) along the coordinates, the coordinate axes themselves, the elevation corresponding to the value (magnitude) of each point for each coordinate, the separation of these points along the direction of the coordinate axes, the separation of the coordinate axes one from another, and the brightness or the color or the occulation frequency of any of these prior items of display artifact including the "dot" representing the data point itself.

This extensive list of examples indicates that such artifact needs to be used with discretion. This is because the vital information is the data space points themselves which can be shown alone in Display Space, or in conjunction with any artifact of choice such as those already mentioned.

It is also possible to assign values to artifact. For example, the distances d in FIG. 12A could be assigned as a function of a dimension w, the orientation (angle) of the coordinate axis of x could be a function of dimension u, or the separation between the parallel coordinate axes for x, y, z, w, etc. could be a function of a dimension v, or the color of selected data points could be a function of a probability of those selected data points being at some selected value or criteria from the Data Space.

It should now be apparent that the distances h, k and d as shown in FIG. 12A are also artifact in Display Space. Any of these artifacts, including all the types of artifact described previously, can also be made a function of any or some of the data (from Data Space). Of particular importance is color. Color assignments to data points or to interconnecting line artifact can be made a function of any of the data (coordinate, dimension or parameter) values in Display Space. Such assignments can significantly enhance (or detract) from visualization cognition. Visualization cognition can also be enhanced by occulating selected data points in Display Space according to selected criteria or data from within the Data Space behavior of the system being displayed.

FIG. 2 also shows that simply by adding more parallel coordinate axes, the parallel coordinate system can be extended so as to map many dimensions as represented by the axes labels (x, y, z, ... w). Thus, a "w" dimensional point $P_{W1}$ from orthogonal space (but not shown in FIG. 1) is mapped into parallel coordinate space by the line connecting the set of points (x1, y1, z1, ... w1) as shown in FIG. 2. The lines connecting these $w_i$ points in parallel coordinate representations as shown in Inselberg's display convention to maintain visual correlation between successive points i.

An important distinction needs to be made regarding the display of multi-dimensional information. Multi-dimensional informational data spaces are to be assumed to be displayed visually in conventional (also referred to as orthogonal) three dimensional perspective display space. Accordingly, any diagrammatic methodology such as a computer output display device can be used to represent, in the display space, the data spaces of interest.

Several different techniques are utilized to represent multi-dimensional data in data space. For example, cartesian methods are known to those skilled in the art, as are the hypercube and teseract extensions thereof. There are also parallel coordinate methods, and newer methods such as arbitrary coordinate mappings. FIG. 3 is an illustration of data space mapped in an arbitrary coordinate mapping. FIG. 3 shows that in the data space of interest, the axes which are shown as being parallel in parallel coordinate methods can be arranged in arbitrary positions relative to each other. Furthermore, the arrangement of axes can be accomplished in conventional two dimensional or three dimensional display space. FIG. 3, for example, shows that the axes (also known as coordinates or dimensions) can be arranged with any desired orientation among them. For example, note that the x' axis in FIGS. 2 and 3 is the same x axis of the orthogonal coordinate system of FIG. 1.

The purpose of these apparently arbitrary orientations could be to highlight or emphasize particular relationships of interest which occur within the data itself. In certain instances, three dimensional orthogonal space orientations of the several coordinates of interest could be utilized to represent the data space.

In econometrics and other business or sociological applications, for example, the many dimensions or variables of interest may not be known to be orthogonal (mathematically independent). Thus, preservation of geometric properties among the mappings shown in FIGS. 1, 2 and 3 is not mathematically relevant. However, when particular relationships or structures are discovered in the data of interest, it could be that such relationships are clarified or made more evident by particular (and no longer arbitrary) orientations of the coordinates representing those variables of interest.

An alternative method of clarifying, emphasizing or discovering important relationships in the data space is to alter a sequence of the variables. In a similar manner, the orientation or separation of the coordinate axes can also be changed for the same purpose.

Those skilled in the art of alternative mappings of data space also recognize that if there are relationships within the data in one of the mappings, there will also be some kind of relationship shown in each of the other mappings. The visual appearance of those relationships will usually be quite different when different mappings are used. Nevertheless, relationships should be recognizable despite the changes. Furthermore, depending upon the relationships of interest, different mappings, orientations and sequences of coordinates can also be utilized to facilitate discovery, recognition or understanding of these relationships.

In display space, practical implementations of these data mappings on two dimensional static or printed diagrams or displays, or non-animated three dimensional models or computer displays, is hampered by the limitations of the display methodologies. FIG. 4 shows, on a two dimensional piece of paper, a large number of data points plotted using parallel coordinates. This figure is taken from an article by Alfred Inselberg and Bernard Dimsdale entitled Parallel Coordinates, A Tool For Visualizing Multivariate Relations. Multi-dimensional data in parallel coordinates is typically as visually complicated as shown in FIG. 4, when printed or displayed in two dimensional display space. This limitation of two and three dimensional representations of parallel coordinate space is well illustrated in Inselberg's publications. In his public presentations, Inselberg has stated that comprehension, when there are more than six or seven dimensions, gets very difficult even with (his forms of displaying) parallel coordinates. It is arguable that the mapping of FIG. 4 has exceeded the human comprehension threshold.

It would therefore be an improvement over the state of the art to provide a new intellectual structure for visualizing data plotted in a parallel coordinate system representative of multi-dimensional data. The new intellectual structure should facilitate an observer in recognizing relationships or structure when it exists within the data, regardless of the number of dimensions in which the data exists.

OBJECTS AND SUMMARY OF THE INVENTION

It is an object of the present invention to provide a method for facilitating observation of data plotted in parallel coordinate space.

It is another object to provide a method for facilitating recognition of structure, patterns and trends within the data plotted in parallel coordinate space.

It is another object to provide a method for movement through and around the data plotted in parallel coordinate space, where movement occurs within a familiar three-dimensional environment.

It is another object to provide a method for generating an observation point in parallel coordinate space which is moved relative to the data plotted in parallel coordinate space.

It is another object to provide a method for movement of the data plotted in parallel coordinate space relative to the observation point.

The present invention is realized in a method for utilizing an intellectual structure for displaying multi-dimensional data which is represented as a computer generated model or plot of data space in parallel coordinates, wherein the data space is presented in a display space which facilitates relative motion of an observer with respect thereto. Accordingly, the essence of the invention is to create the motion because it significantly facilitates and enhances comprehension of relationships, structures, patterns or trends within the data space.

More specifically, in the presently preferred embodiment, a computer programming language referred to as the virtual reality modeling language (VRML) is utilized to create a visualization environment (display space model) in which is disposed the multi-dimensional data of interest. Put simply, the multi-dimensional data is modeled within a three dimensional environment. This is accomplished by creating a matrix representation of the multi-dimensional data, and then transforming the matrix into data which is understood by the VRML which then facilitates motion of the displayed data space with respect to the observer.

In another aspect of the invention, any programming language can be used for developing a three-dimensional visualization environment which enables movement therethrough.

In another aspect, the modeling of the multi-dimensional data can be modified to thereby facilitate recognition of relationships therein. For example, one convention is to hide the coordinate axes, and draw lines between associated data points.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Figure 1:
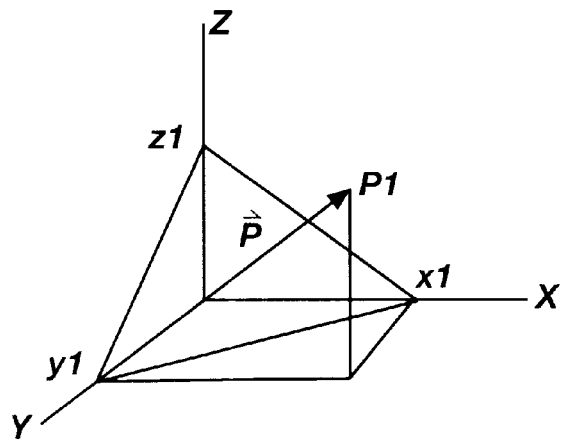
FIG. 1 is a conventional three-dimensional orthogonal (cartesian) coordinate system as known in the prior art, where a point P1 is plotted in a perspective view with respect to all three axes.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

At first blush, it would seem that describing the present invention is hampered when asking a reader to visualize phenomena which the human brain must be fooled into believing is reality. However, since the advent of the graphical computer program, computers have been utilized for creating virtual reality. Not surprisingly, as the speed and sophistication of computers and the graphical programs increase, the virtual reality appears more and more visually real to an observer. In particular, one useful tool for this purpose is the creation of a three-dimensional display environment (display space) which includes three-dimensional modeling of data objects (data space).

Two examples which readily provide a familiar setting for the concepts described above are a planetarium's "spaceship" ride through the cosmos, and a first person role-playing computer game. In the spaceship ride, an observer aboard the spaceship is typically caused to travel among the stars, a truly three-dimensional environment without known boundaries. The ride can crudely be likened to the experience of watching a computer screen saver with a pattern of stars "thrown past" the monitor.

In the computer game, a computer screen serves as the "eyes" of a person who is caused to move through what the brain is fooled into believing is a three-dimensional environment. By creating objects and an environment which includes perspective and differential motion proportional to distance from the observer and to the distance between objects in the data space, objects can be made to appear both near and far relative to each other, despite the fact that the computer screen is a flat, two-dimensional surface.

The present invention takes advantage of advances in the creation of virtual reality environments. Specifically, the VRML programming language is utilized to create a parallel coordinate system or space, plot data points, connect the data points with lines (either across points, across dimensions, both, or not), eventually remove or never draw the axes of the parallel coordinate system, and then most importantly, to cause the observation reference point (the computer screen) and the parallel coordinate space with the plotted data points to move relative to each other. The view of the virtual environment as seen from the perspective of the computer screen or display appears to move according to specific commands which can be input to the computer system. It should also be mentioned that while the VRML is utilized in the presently preferred embodiment of the present invention, any graphics program which can generate a three-dimensional environment and move within it, can be used.

Despite the fact that the two-dimensional paper on which this document is written cannot provide the reader with a feel for movement through the virtual environment, it is possible to adequately describe the experience through a series of figures and analogies.

Figure 2:
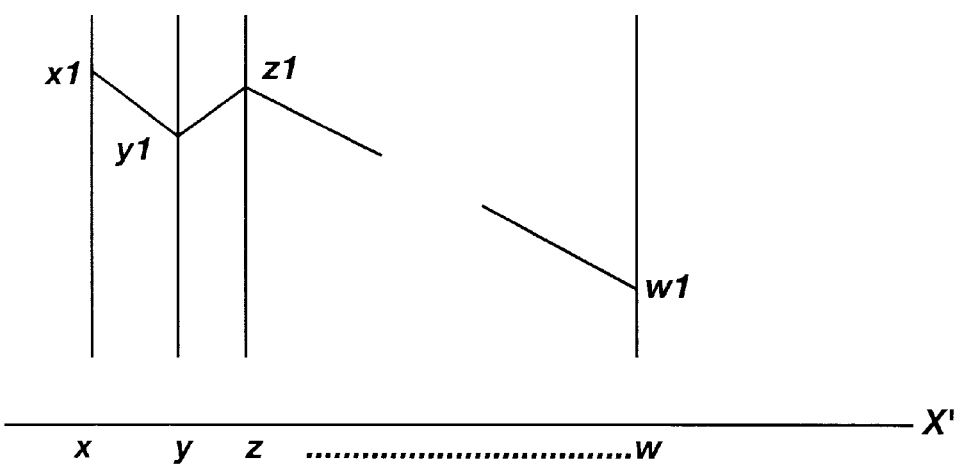
FIG. 2 is a parallel coordinate system as known in the prior art where n-dimensions are shown as separate axes along a base axis in conventional 2D space.
Figure 5:
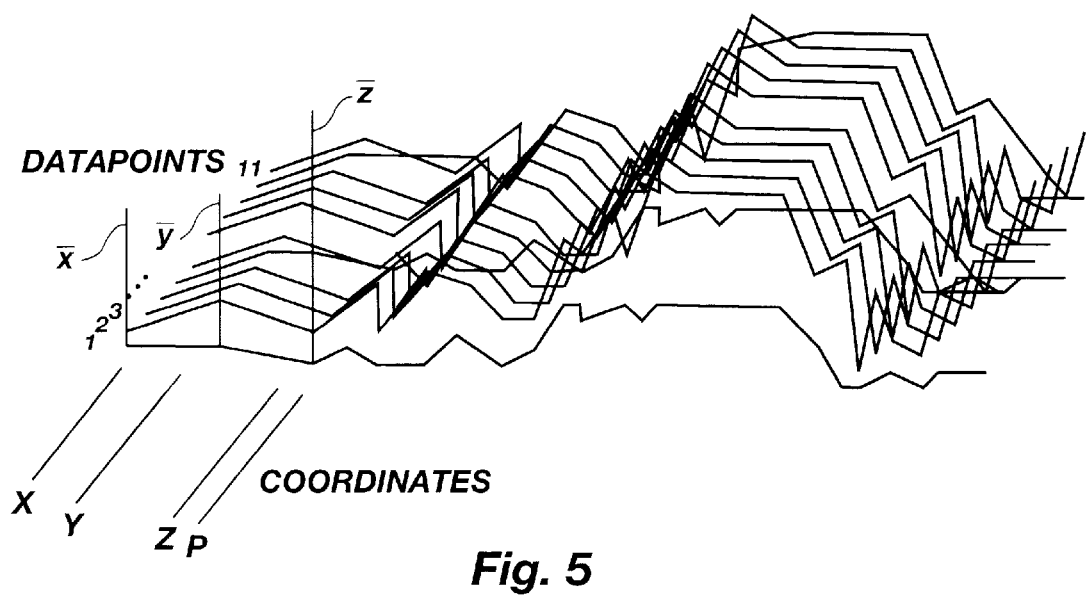
FIG. 5 is a perspective view of parallel coordinate data sets rendered in a three-dimensional environment, where such images typically appear as mountain ranges when the parallel coordinate system axes are removed so as to only show the interconnected data sets. It is noted that the data sets which are plotted in FIG. 5 are different than the data sets of FIG. 2 and 4.

For this purpose, consider that the parallel coordinate space as represented in FIG. 2 is mapped onto a computer screen which shows a three-dimensional virtual environment. Utilizing the VRML, typical data sets rendered in this fashion tend to look like topographical representations of mountain ranges as shown in FIG. 5. The mountains show relief and topography similar to that seen in three-dimensional image projections of geographic mappings of actual mountainous terrain. In this virtual environment, the ability has also been provided to "fly" through the parallel coordinate data sets and inspect them from any angle, orientation, distance and perspective. It is this ability to fly through the data sets that makes VRML an excellent choice for modeling the parallel coordinate space data sets on the computer. Therefore, FIG. 2 is a static image of a two-dimensional representation of three-dimensional parallel coordinate space data sets.

Figure 6:
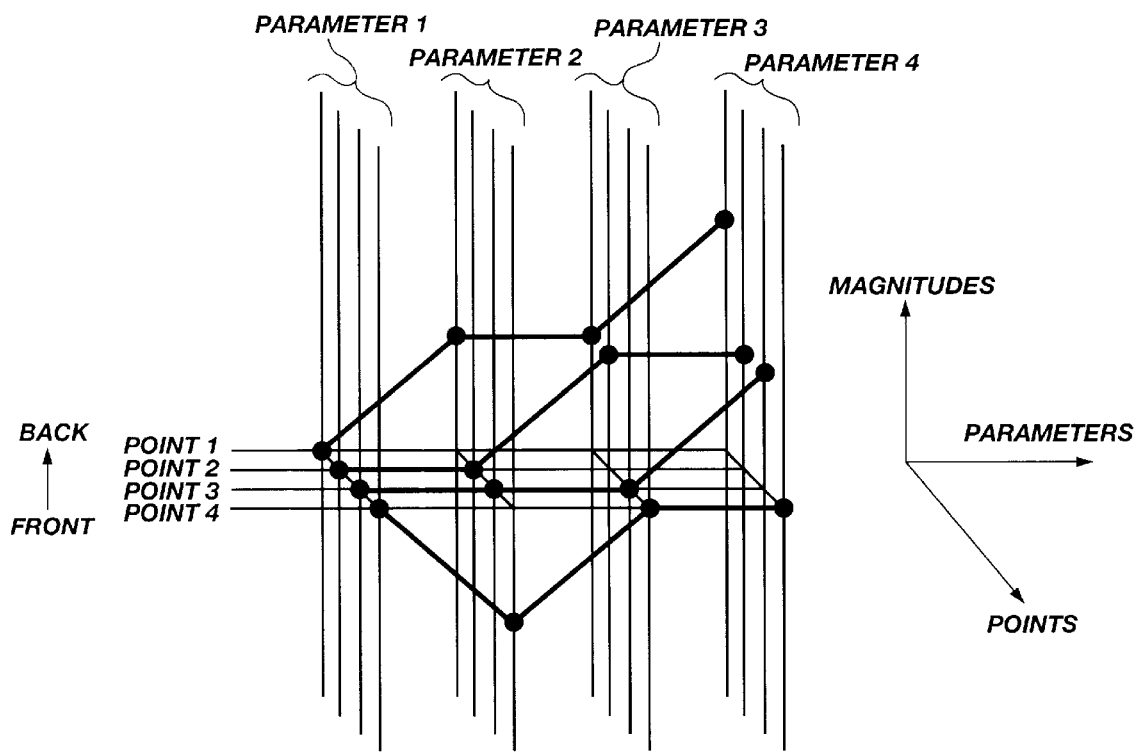
FIG. 6 is a plot of table 1, illustrating the concept of what is being referred to as magnitudes, parameters and points. This plot describes the display convention of the preferred embodiment as created by n-Dimensional Visualization (nDV). This is the same display convention as used in FIG. 12A. This display convention is in contrast to that used by Inselberg and shown in FIGS. 2 and 4.

The following explanation is provided to explain in greater detail the elements of n-dimensional (or parameter) space. A data set consists of a set of points. Each point is characterized by a set of magnitudes associated with each parameter or dimension. Each magnitude represents the value of a distinct parameter or dimension. The points all have a value for each parameter. To illustrate the explanation above, table 1 below is plotted in FIG. 6 to more explicitly show the relationship between the magnitudes, the parameters and the points.

TABLE 1

| | Parameter 1 | Parameter 2 | Parameter 3 | Parameter 4 |
| --- | --- | --- | --- | --- |
| Point 1 | 0 | 1 | 1 | 2 |
| Point 2 | 0 | 0 | 1 | 1 |
| Point 3 | 0 | 0 | 0 | 1 |
| Point 4 | 0 | −1 | 0 | 0 |

Plotting a set of multi-parameter points in three-dimensional space starts by plotting each point in parallel, two-dimensional space. Each magnitude is plotted along one axis and the parameters are distributed in a regular manner along on orthogonal axis. Then the points are distributed along a third orthogonal axis such that the parameter sets of all the points line up. The structure is like plotting each point on a separate sheet of paper in the manner of parallel coordinates and then stacking the sheets. Another way to think of it is to imagine a square grid where the columns are the parameters and the rows are the points. The magnitudes of each point are set proportionally in the direction normal to the parameter/point grid.

The result of this structure is a set of elevation plots over a square grid. The elevation plots can be interpolated (using line artifact) to form a surface that is characterized by ridges that run along the parameters and across the points. A unique aspect of this structure is the instantaneous view it provides of parameter value trends across the whole data set. Visualization of the surface formed can be facilitated by lines connecting the set of magnitudes across the orthogonal axis. One does not "see" the point magnitudes directly, but rather "sees" the interpolated surface formed by the set of connected magnitudes.

Figure 4:
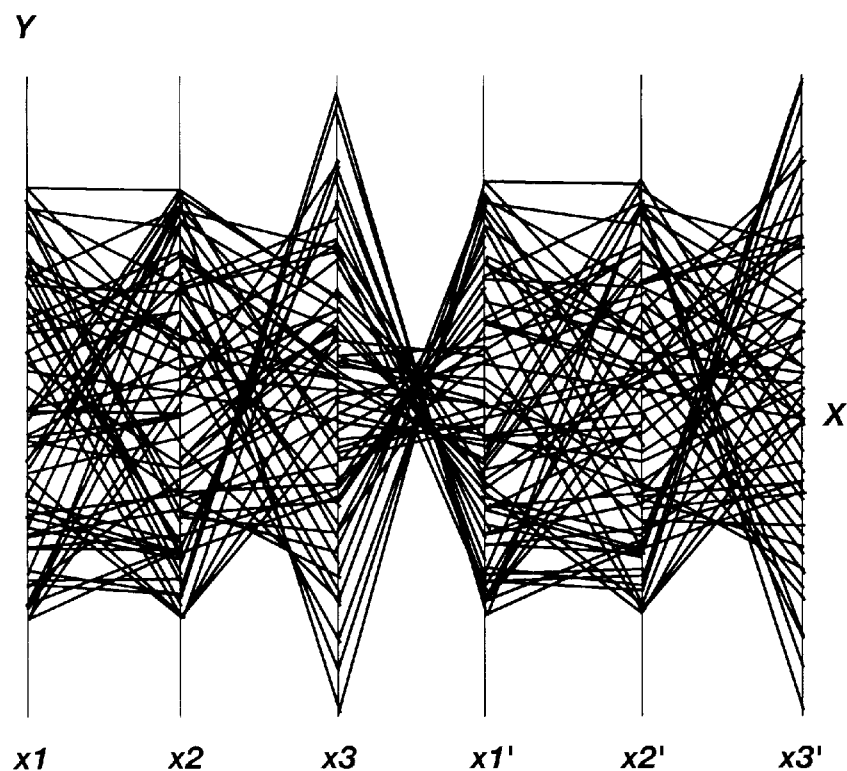
FIG. 4 shows on a two-dimensional piece of paper a large number of data points plotted using the parallel coordinate system, where these points define a set of coplanar points on the first three axes. The figure demonstrates the failure of the parallel coordinate system alone to meaningfully illustrate or reveal structure where there are a large number of data points, a large number of dimensions (coordinate axes), an unnecessarily complex display convention, or all three.
Figure 3:
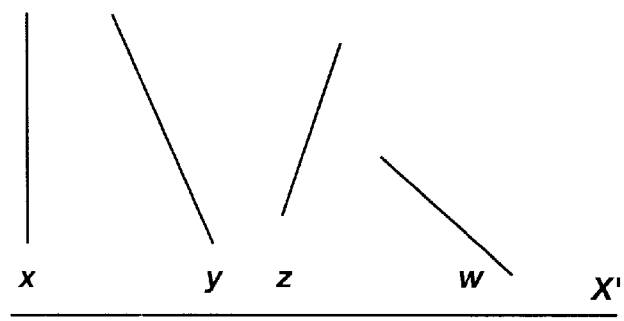
FIG. 3 illustrates that the "parallel" axes of FIG. 2 can be placed in arbitrary positions relative to each other, thereby demonstrating one aspect of the parallel coordinate systems' flexibility in visualizing n-dimensional data.

An alternative representation is to connect the data with lines, not across the data points in each row of data, but rather across the dimensions. Relating this to the description of FIG. 6 which plots the data of Table 1, the data is plotted not for each point (across the parameters), but rather plotting each parameter on a separate sheet of paper along the points. It would be like connecting the points between the separate sheets of paper for each parameter. This manner of plotting the n-dimensional coordinate space is fundamentally different from the n-dimensional coordinate space of Inselberg as seen in FIGS. 2 and 4. It is this aspect that makes possible the unique and simple interpretational potential of the present invention.

It should be noted that the (artifact) lines are connecting the values of individual data parameters, not their projections as in conventional 2D or 3 D renderings. In FIG. 1, the individual data parameters (x,y,z) establish point P1 which is usually represented by the vector P. In n-dimensional space, the values of the parameters $x_1$, $y_1$, $z_1$ can be connected by (artifact) lines directly.

To move a data set from raw data to being plotted in the display space, it is necessary to transform the data set to something which is understandable by the VRML. Those skilled in the art will recognize that APPENDIX A which is appended to this specification provides a macro routine written in the EXCEL (TM) macro language. The macro routine receives as input a table of data from an EXCEL (TM) worksheet, models the data, and then saves the model in a VRML file. The VRML browser is then activated to read the VRML file, cause the data space to be represented in display space, and then facilitate fly-overs or fly-throughs of the displayed data space.

Figure 7:
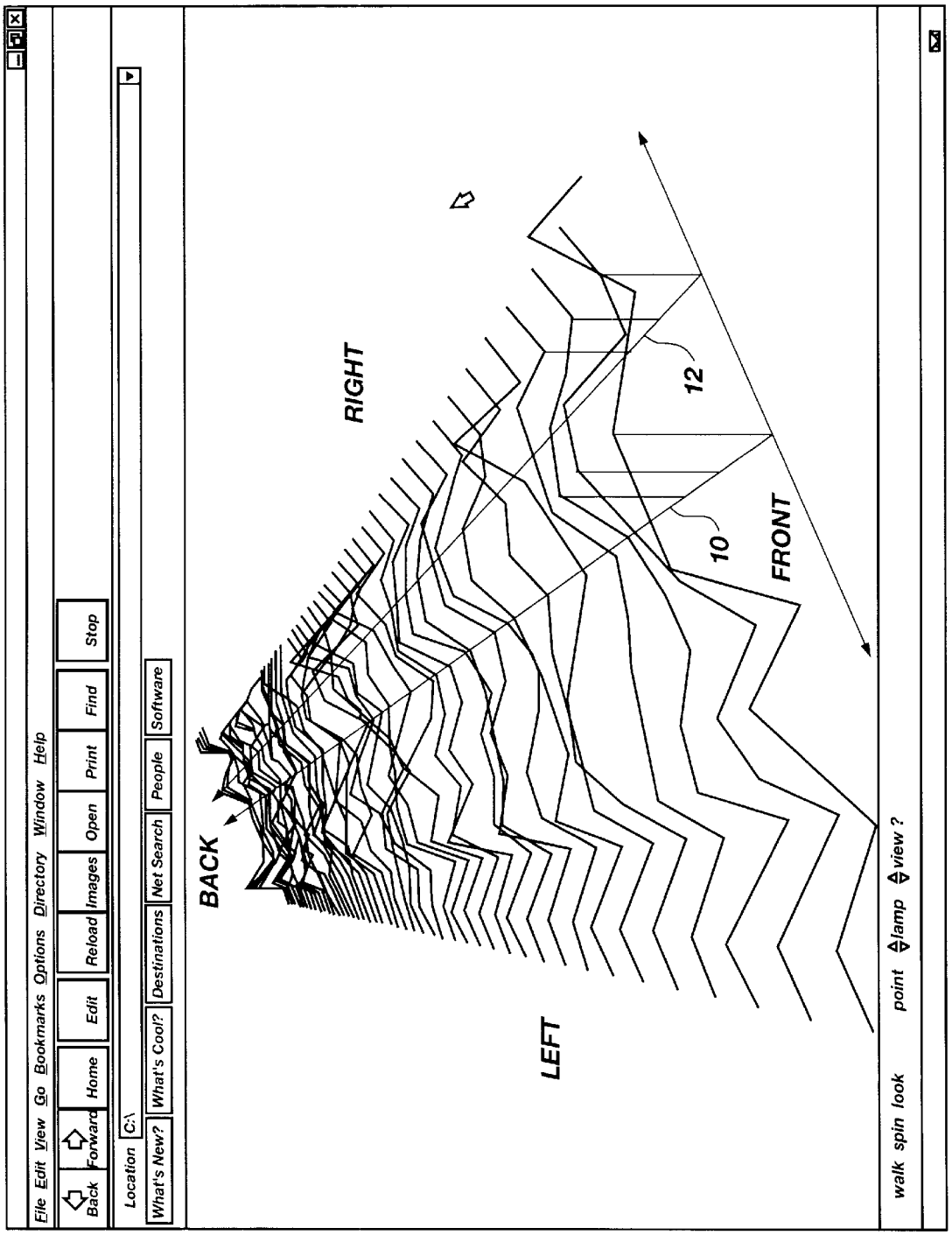
FIG. 7 is a first figure in a series of computer generated images which represent different views of the same data set which is mapped in nDV's parallel coordinate system with the axes removed as in FIG. 5. These different views show the different elevational differences within the data set. A single data point from orthogonal space is represented by a single line.

FIG. 7 is a first in a series of figures of parallel coordinate data sets which are different than those shown in FIG. 5. However, the series of figures (FIGS. 7–11) offers multiple views of the same data sets. These views are important in that they reveal structures, patterns or trends which are not visible from the different perspective views.

For example, FIG. 7 is a view which is useful for showing the different elevational differences between the data sets, where a single data set (or point from orthogonal space) is represented by the artifact of a single jagged line. For illustration purposes, the axes of the parallel coordinate system have been removed. If they were shown, the parallel coordinate system axes would be placed parallel to each other, and would intersect the data set lines whenever the data values cross from positive to negative. To help visualizing their placement in what is shown, two partial axes 10 and 12 have been drawn over the data sets. By removing the axes from the figures, the structures, patterns or trends are more easily recognizable. This only makes sense because the remaining lines belong exclusively to the data sets, and not a structure (axes of the parallel coordinate system) relative to which they are formed.

Figure 8:
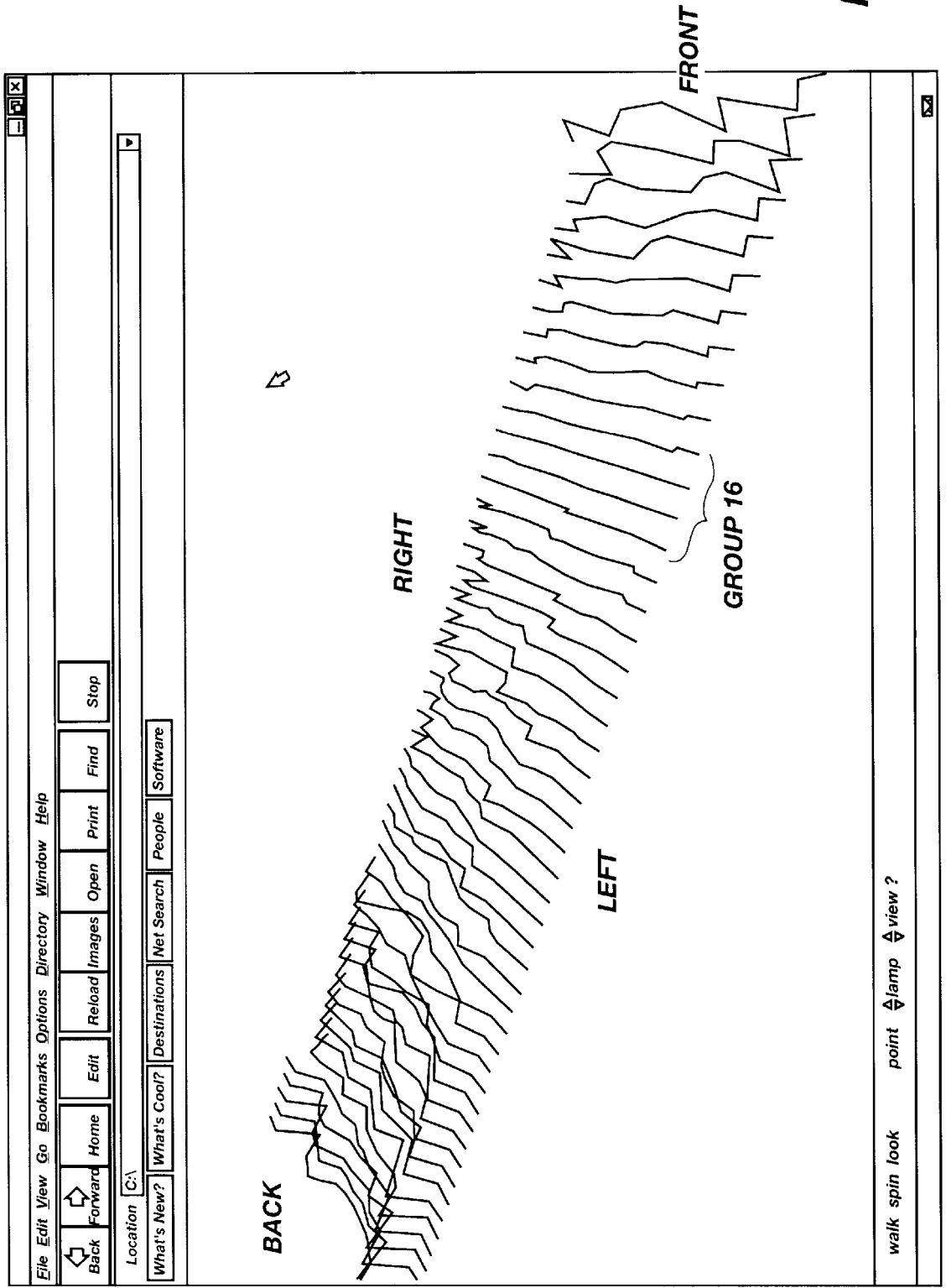
FIG. 8 is a second figure in the series of computer generated images which represent the different views of the data set of FIG. 7, all of which are mapped in nDV's parallel coordinate system with the axes removed.

FIG. 8 is a computer generated representation of the same data sets shown in FIG. 7. However, a different perspective view of the data sets is provided. Relative to FIG. 7, the viewing perspective (observation reference point) has now moved from a front end of the data sets to the left and upward. Notice that from this new perspective, elevational displacement of some data sets is now more apparent than in FIG. 7. Particularly, the data sets on the ends are more distinguishable. However, other data sets now show less elevational data relative to their neighbor data sets. For example, observe the data sets marked as group 16. In this group 16, almost all elevational information is lost because the data sets are now seen generally parallel to a long axis, and from above. Consequently, no useful information is derived therefrom.

Figure 9:
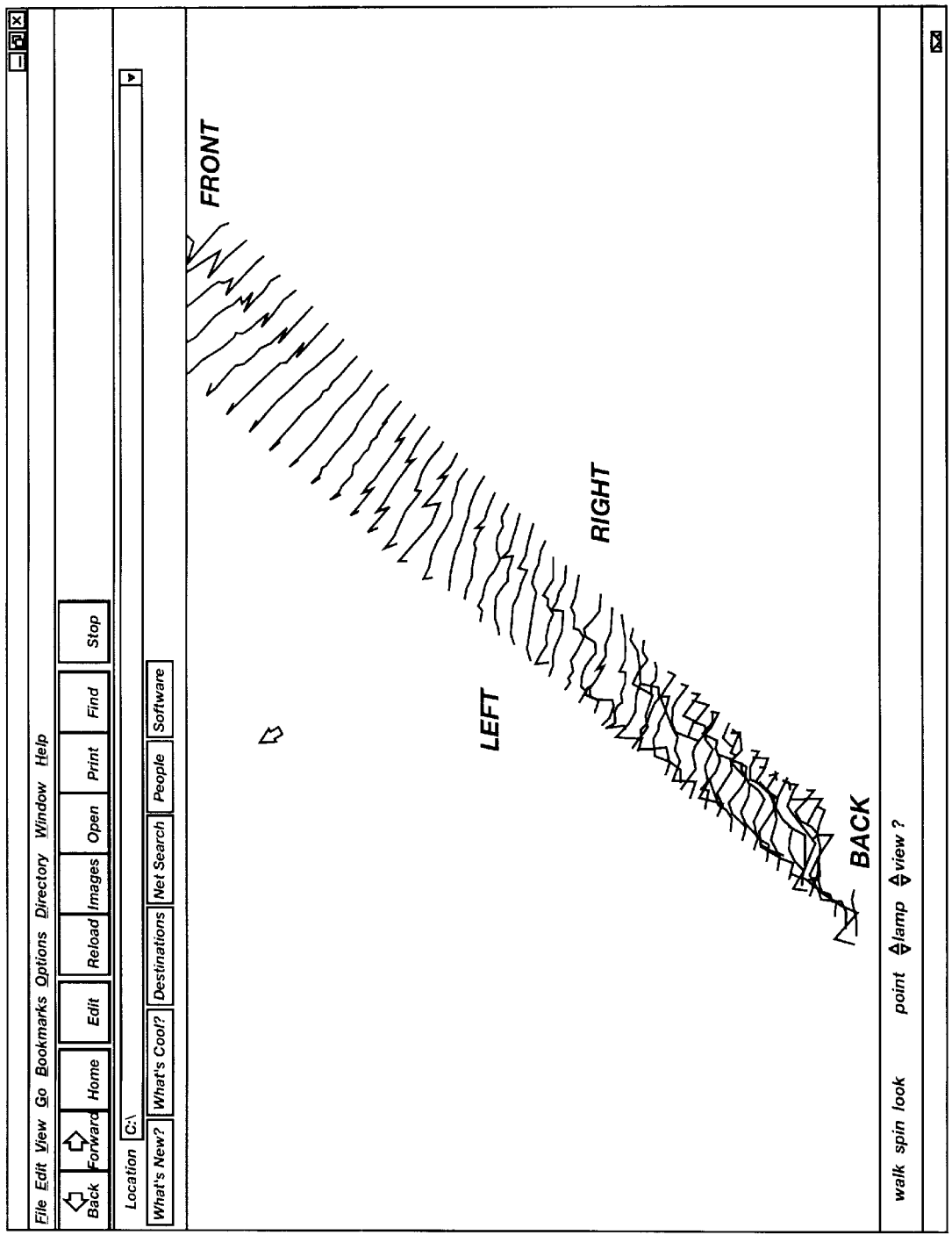
FIG. 9 is a third figure in the series of computer generated images which represent the different views of the data set of FIG. 7, all of which are mapped in a parallel coordinate system with the axes removed.

FIG. 9 is a computer generated representation of the same data sets shown in FIGS. 7 and 8. Again, a different perspective view of the data sets is provided. This time, the data sets are seen from below and slightly to the left.

Figure 10:
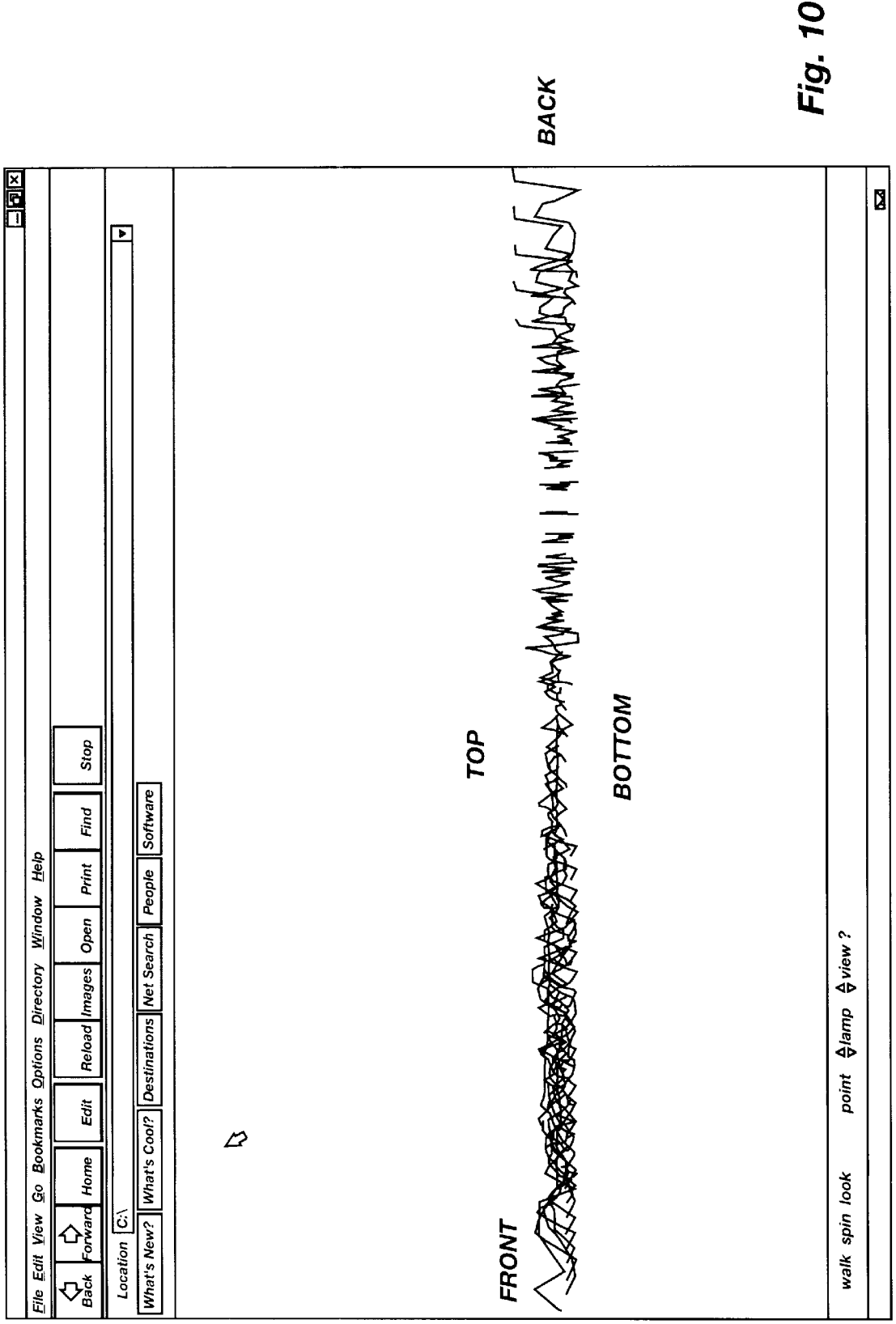
FIG. 10 is a fourth figure in the series of computer generated images which represent the different views of the data set of FIG. 7, all of which are mapped in a parallel coordinate system with the axes removed.

FIG. 10 is also a computer generated representation of the same data sets shown in FIGS. 7, 8 and 9. Again, a different perspective view of the data sets is provided. This time, the data sets are seen edge on from the right side.

Figure 11:
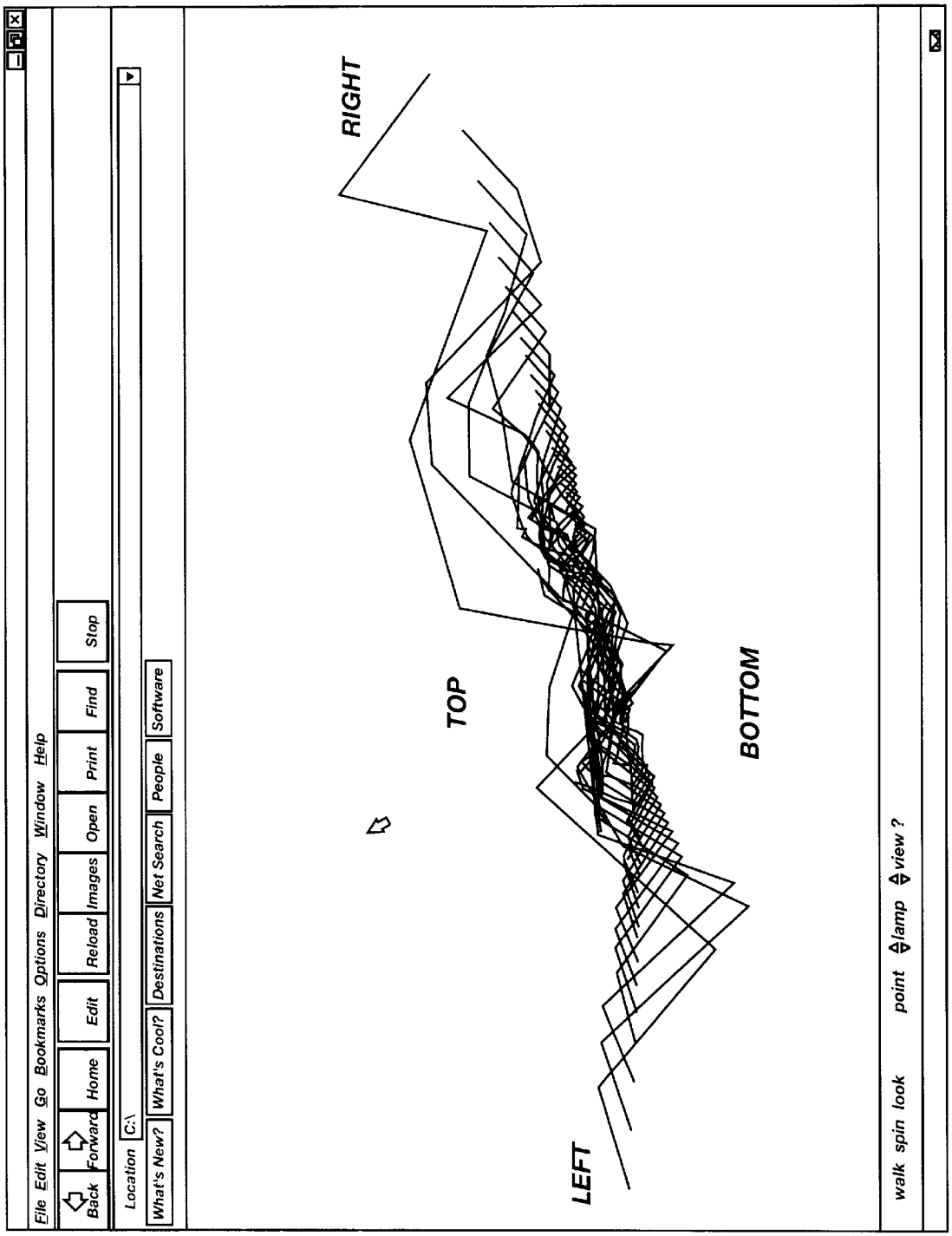
FIG. 11 is a fifth figure in the series of computer generated images which represent the different views of the data set of FIG. 7, all of which are mapped in a parallel coordinate system with the axes removed.
Figure 12A:
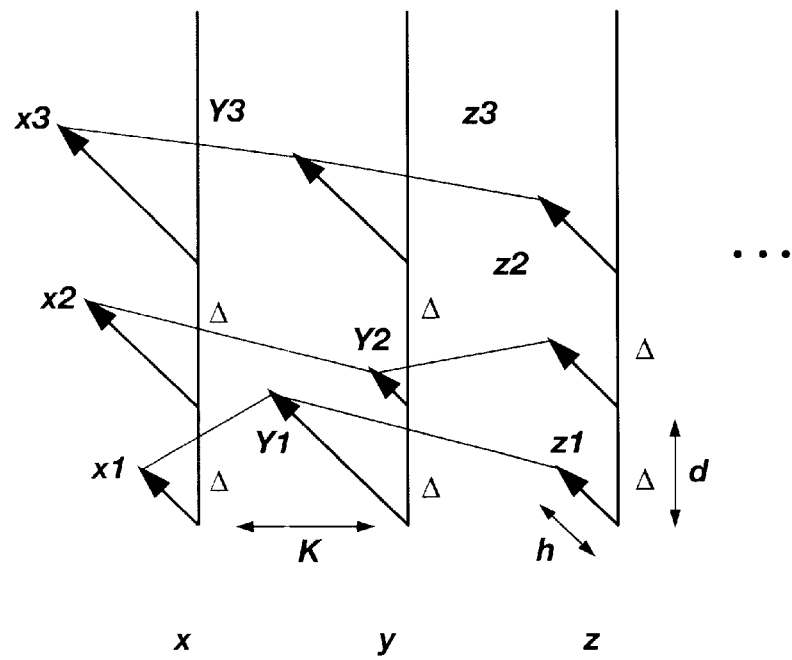
FIG. 12A is a perspective view of parallel coordinate space utilizing 3 parallel coordinates and viewed as enabled by the present invention.
Figure 12B:
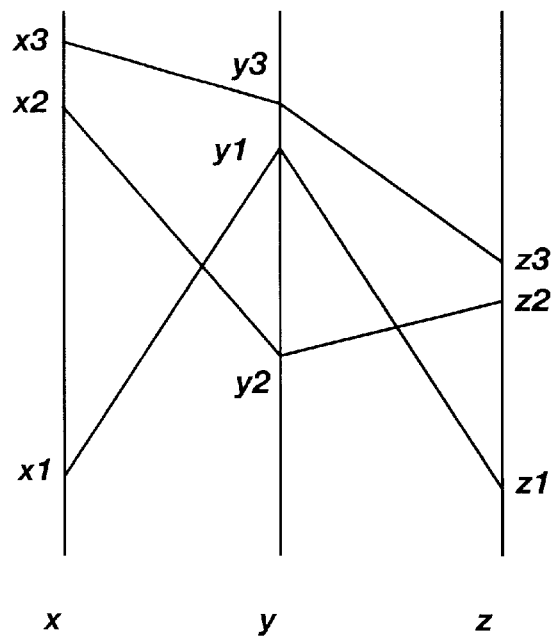
FIG. 12B is a view of the same data shown using the parallel coordinate system as taught by Inselberg et al.

Finally, FIG. 11 is also a computer generated representation of the same data sets shown in FIGS. 7, 8, 9 and 10. Again, a different perspective view of the data sets is provided. This time, the data sets are seen from the front end looking "down" the long data space axis toward the back.

It is observed that FIG. 11 is similar to FIG. 4 because both are front-on views. FIG. 11, however, displays some perspective of the data sets so that an "illusion" of depth is experienced. FIG. 4 has no such perspective.

What is important to understand from the series of FIGS. 7, 8, 9, 10 and 11 which show different views of the same data sets is that each view provides only a partial perspective of the structures, patterns or trends which the data sets contain. Even using all of the static figures together fails to provide a complete "picture" of the data sets. This "picture" has been discovered to be best completed by observation of the data sets relative to movement therearound and/or therethrough. It is the act of movement or "flying" around and through the data which enables the human brain to perceive or recognize useful relationships or structure in the data information.

In essence, the present invention is a new visualization and data space structure which separates the visualization of display space from the data space. This structure represents a multi-dimensional parallel coordinate data space model system displayed in classical three-dimensional virtual reality display space. This structure permits introducing the action of movement, either apparent motion by the observer, or apparent motion of the data sets with respect to the observer's views of the parallel coordinate space (which may have the coordinate axes removed to better reveal the structures, patterns or trends of the data or other display artifact added or deleted). What is structurally different about a ride or flight of an observer through the data sets in the present invention is the implication of where that ride is taking place. In the example of the game or the planetarium space ship, the observer is traveling through astronomical three-dimensional space and observing three-dimensional phenomena. In contrast, the present invention enables travel in a three-dimensional environment to observe multi-dimensional phenomena in a separate, mathematical data space.

It is important to note that the spatial non-orthogonal data space coordinate system as shown in FIGS. 7–11 is defined to include parallel coordinate systems or any non-orthogonal coordinate system.

The purpose in providing a visual virtual reality medium for viewing data sets mapped in parallel coordinate space comes from the realization that human visual perception is a powerful tool. As stated by Banchoff, "[a]ll observational scientists rely on their ability to recognize trends and patterns, to identify regularities that lead to predictable behavior. Our visual sense is our most powerful faculty for discerning such patterns. One of the most effective ways of bringing our visual faculty into play is to interpret the sequence of measurements for each observation as a point in a space of the appropriate dimension."

However, a statement that the present invention enables discernment of structures, patterns or trends within the data sets begs the question as to how movement enhances human perception. Consider the example of the planetarium spaceship moving through the stars. Movement through space causes an apparent motion of the stars relative to an observation reference point. The stars will appear to move toward the observation reference point. The nearest stars appear to move the fastest and will move quickly past the observation reference point. More distant stars will appear to move little or not at all. Accordingly, the relative distance of the stars will be apparent to an observer at the observation reference point once the observation reference point begins to move, or the stars are moved past the observation reference point.

Intuitively, the example above makes sense when realizing that when looking at a constellation of "static" stars in the sky, it is impossible to really know if they are actually associated with each other, or whether they are merely in a chance alignment. However, once movement begins, the associations of the stars of the constellation would betray themselves as they show apparent motion. Now, with the assumption that the stars of the constellations are data points in a parallel coordinate system, the analogy to the present invention becomes complete. One visual difference is that each single data point from orthogonal data space is represented in parallel coordinate data space as a number of points coupled to each other by (artifact) lines drawn therebetween.

There is a great amount of freedom in the visualization of parallel coordinate space in the present invention. As a practical matter, the parallel coordinate system axes can be rotated about any of the three dimensions (axes) of the visualization space. Furthermore, it is also possible to arrange the parallel coordinate axes in any desired fashion within the visualization space. In other words, the coordinates (axes) that are shown as being parallel in FIG. 2 could be rearranged so that one of the axes is a central axis, and where all other axes are as splines of a cactus extending therefrom.

That it is not possible to truly "see" the three-dimensional nature of the objects illustrated in FIGS. 7–11 because they are drawn on a two-dimensional surface of paper really proves the point of the present invention. This is because visualizing the perspective of lines is not the same thing as visualizing the perspective of moving objects. Only through following the method of the present invention can the observation reference point move below, to the left, the right, behind or even inside of the data. Furthermore, this motion can be in real-time or artificial time.

It should also be realized that the ability to move through the data does not guarantee that structures, patterns or trends will be found. Nevertheless, by taking advantage of the sophistication of the human visual system to gain insight into the data, the present invention makes it possible to more readily determine if such structure exists. As Banchoff stated, "[o]nce we see the data laid out on a familiar framework in two or three dimensions, we can identify relationships that are simply invisible if all we can see is a long list of measurements." At present, these structures could be hidden or lost amongst the "mountain ranges" of data for large data sets and easily escape notice via conventional statistical and analytical methods.

Nevertheless, once movement through and/or around data sets is provided, it also provides the opportunity for particular sections of the data sets to be isolated for closer examination. Much like "blowing up" a particular portion of a photograph to pull out obscured detail, the present invention makes it possible to identify areas of data of possible interest, and then to focus the visualization system on that particular area. Indeed, it should not be surprising that structures in a data set will go unnoticed until an observer begins to change position relative to the data to obtain new perspectives.

In comparing the method of the present invention to conventional renderings of objects in three-dimensional space, it is another important distinction to observe that movement therethrough is generally relative to time, where time is not one of the observable dimensions. In distinct contrast, the present invention can include data-space-time as one of the data dimensions being mapped in parallel coordinate space. Therefore, the observer's motion through and/or around the data sets would not occur relative to time in the data set. Instead, the data space mapping can include a time dimension which is statically displayed in three dimensional space as the observer is able to fly around the data space in display-space-time and see it from all perspectives. This enables data-space-time-independent examinations of possible data structures.

It is emphatically stated that while the substantial benefits to be achieved from apparent movement relative to data sets are hopefully made explicit in the detailed description above, it should not be assumed that this conclusion is obvious in light of the state of the art. All prior methods of visualizing data depend on the limited benefits of static graphs and other mappings of data sets. Furthermore, those that utilize parallel coordinate systems do not incorporate movement therethrough. It has been observed that conventional techniques for plotting large numbers of data sets typically result in data overload rather than enhancement due to the limitations in the ability of the observer to distinguish structures. It has even been stated that the representation of parallel coordinates is not practical beyond 6 or 7 dimensions.

Additional details of the presently preferred embodiment of the method of the present invention will now be provided to enable implementation of the concept of the present invention. In an overview, the method includes the step of first generating the raw data representative of the information to be plotted in the parallel coordinate space. Next, a computer programmed spreadsheet is thus utilized to create or define data points. A spreadsheet macro is then executed on the data points which converts the data into an intermediary set of data points. The intermediary set of data points can then be normalized, if desired, to obtain a final set of data points suitable for mapping into the parallel coordinate space within the visualization space. The final set of data points is a VRML script which is executable by a graphics program capable of executing VRML instructions. The VRML is further utilized to provide instructions to the graphics program as to how to move the observational reference point relative to the parallel coordinate space. More specifically, the method of the present invention includes an n-dimensional visualization viewer which enables modeling of any data set involving any number of variables. Practical limitations to the size of data spaces are imposed only by available hardware components such as computer memory, display pixel count, and video card resolution. Therefore it is not the method which limits the size of data spaces.

After entry of the data points into the spreadsheet, a visual basic data render routine (VBDRR) is utilized to generate the VRML model (by generating VRML script). The VRML model is then opened in a VRML graphics-capable computer program (browser) to view the n-dimensional model of the data sets. In this presently preferred embodiment, the VRML is incorporated as a plug-in module of an internet browser. Using a mouse or other pointing device on a computer, the observer is able to input commands to the browser which enable the observer to fly through and around the data to visualize the relationships and correlations which are presently not as easily visible using any other method of data analysis. The VRML program is incorporated as APPENDIX A to this document. The Visual Basic rendering routine is attached as APPENDIX B.

There are also a significant number of enhancements to the method described above which improve upon the basic process. For example, in a first alternative embodiment, it is possible to highlight a number of data sets for more detailed scrutinization. This scrutinization includes zooming in to see more detail when the data sets have been modeled relatively close to each other. It should then not be surprising that it is also possible to zoom out.

Another feature of the present invention is the ability to highlight data points, a data set, or groups of data sets. Highlighting can include providing visually distinguishing features of the highlighted data. For example, the color of the highlighted data can be altered so as to appear distinct from the non-highlighted data. This can include coloring the lines which connect data points. It should be said that colorizing data also includes the ability to change as well as add color to data.

Another aspect of the present invention is providing the ability to rescale or to renormalize the data. Rescaling all of the data is useful in situations where the data, at a present scale, is drawn so tightly together as to negate the advantages of being able to move around and through the data.

Another important aspect of the present invention is the ability to modify the order or sequence or spacing of the coordinate axes in which the variables are displayed. This is possible because it is often the case that there is no fixed relationship between the dimensions, thus allowing this rearrangement.

Along with the concept of modifying how the coordinates are displayed, the space between variables such as data points or data sets can also be modified. Although rescaling can also adjust space between data points in an individual data set, the spacing between data sets can also be critical for providing the proper perspective to enable the observer to visualize structures.

It is also useful to be able to apply labels to various features which are identified within the parallel coordinate space by the observer. These labels can be anchored to specific locations and caused to be visible regardless of the relative position of the observer to the location of the labeled feature. Labels can even be color coordinated so as to match the color or colors of highlighted data.

It is also a feature of the present invention to be able to examine raw data for a particular data point, data set or data sets. Along these lines, it also possible to apply conventional statistical analysis to particular selectable portions of the data. The analysis results might also be displayed near the mapped data from which it is derived. Alternatively, the results can also be displayed separately from the n-dimensional viewer, and provide a whole new set of data which an observer can move through.

Figure 13:
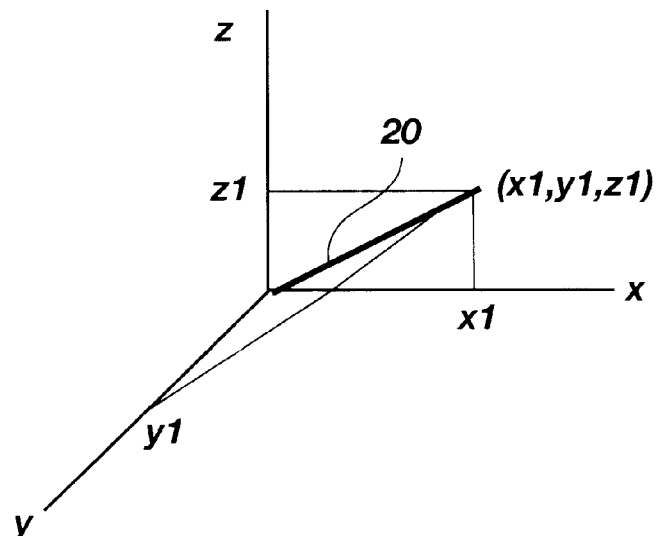
FIG. 13 is a classical prior art perspective view of a line in 3 orthogonal coordinates.
Figure 14:
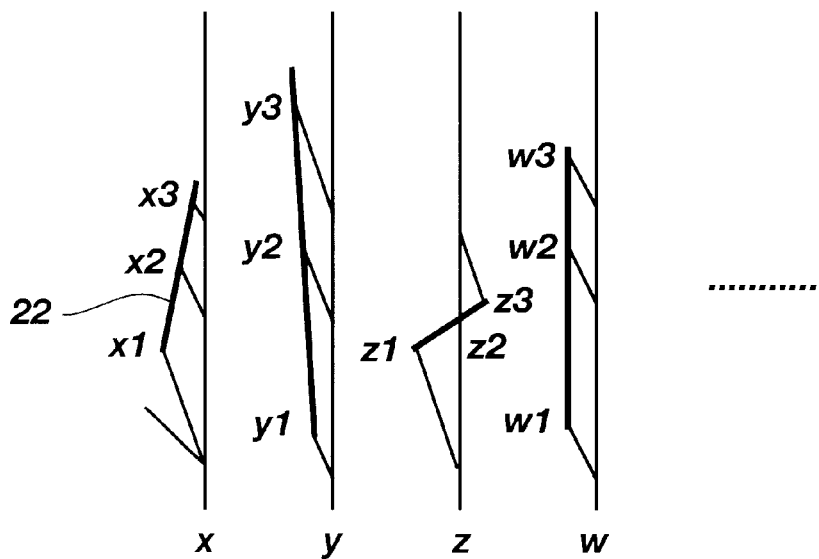
FIG. 14 is a view of the straight line of FIG. 13, but seen using 4 parallel coordinates.

A significant aspect of the present invention is being able to visually recognize that points, lines, and other structures in one particular coordinate system take on a very different appearance in another coordinate system. For example, FIG. 13 is a classical perspective view of a straight line 20 in 3 orthogonal coordinates. In contrast, this same straight line 20 appears very differently in FIG. 14 which shows the straight line 20 in a coordinate system having 4 parallel coordinates. Note that in FIG. 14, the definition of a straight line (in multiple dimensions) is that it is straight in each coordinate. Thus, the line 22 is straight but diminishing as the values x1, x2, and x3 progress, the values of y1, y2, and y3 are increasing, the values of z1, z2, and z3 go from positive to zero to negative, and the values of w are a constant. It should be apparent that in orthogonal coordinates, it is more difficult to represent a 4th or higher dimensional straight line, whereas in parallel coordinates it is simple to see how to add dimensions as appropriate.

Figure 15:
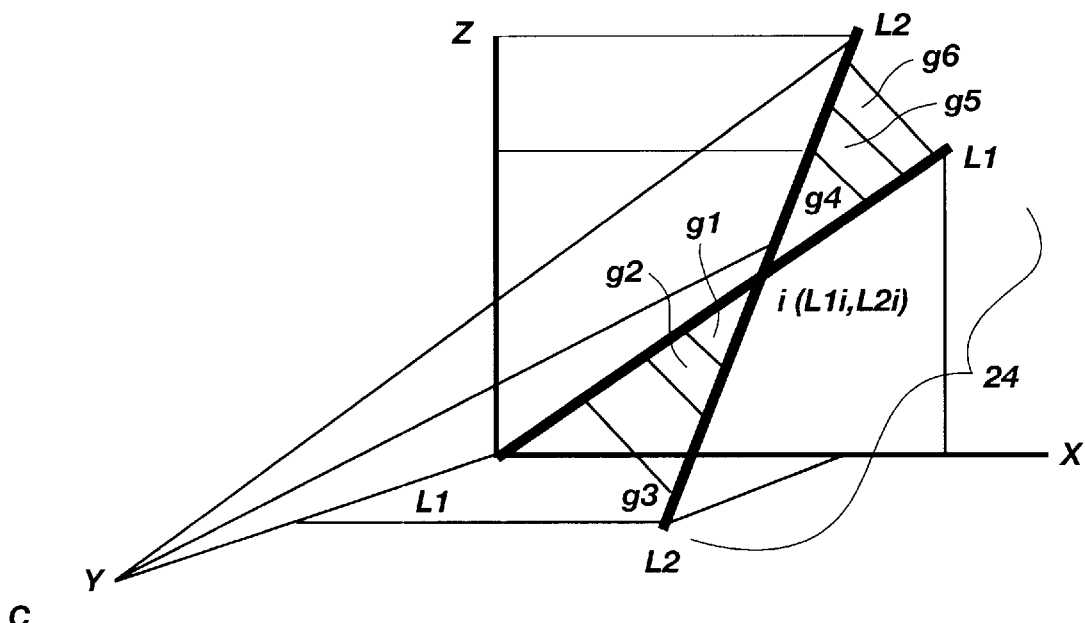
FIG. 15 is a classical prior art perspective view of a plane in 3 orthogonal coordinates.
Figure 16:
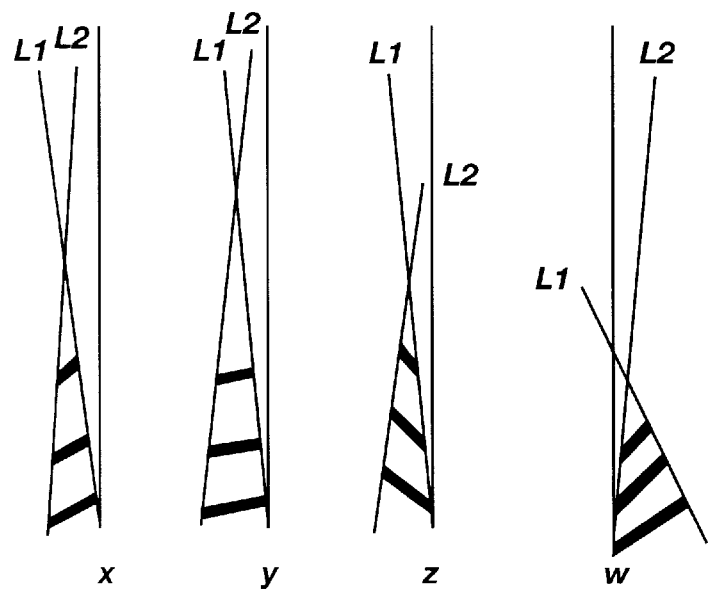
FIG. 16 is a view of the plane of FIG. 15, but seen using 4 parallel coordinates.

Along with the straight line 20 shown in FIGS. 13 and 14, FIGS. 15 and 16 represent different coordinate system views of a plane 24. FIG. 15 shows the classical perspective view in 3 orthogonal coordinates of the plane 24. The two straight lines L1 and L2 intersect at a point i (L1i, L2i) where the x, y, and z coordinates of each straight line are all equal in value. Note that the plane 24 defined by these two intersecting straight lines L1 and L2 is depicted here by the lines $g_j$. FIG. 16 is a view of the plane 24 using the principles of the present invention. While the plane 24 is shown in 4 parallel coordinates, there could be an arbitrarily higher number of coordinates. The heavier lines of FIG. 16 are the individual coordinate projections of each of the lines $g_j$ shown below the intersection at point i in FIG. 15; the upper lines above point i of FIG. 15 are not shown in FIG. 16 for simplicity in viewing this structure. Thus in parallel coordinates, a plane appears as plane-platelets in each of the multiple coordinates for which that plane is defined to exist.

Figure 17:
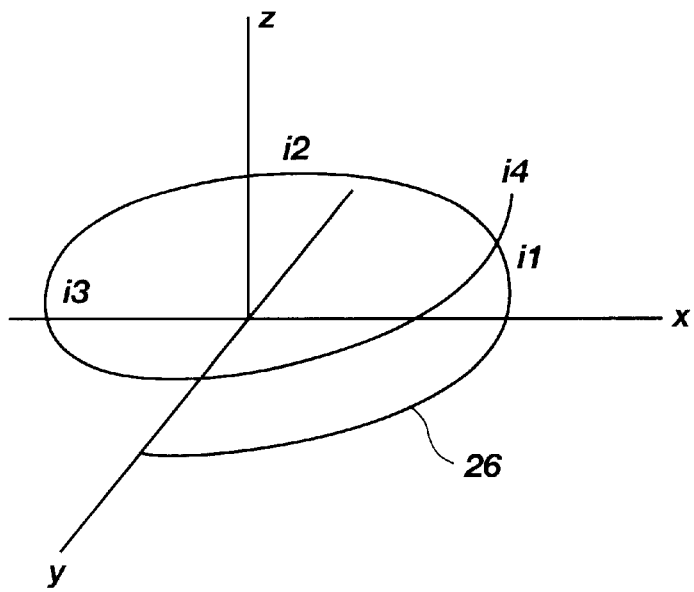
FIG. 17 is a classical prior art perspective view of a circular helix in 3 orthogonal coordinates.
Figure 18:
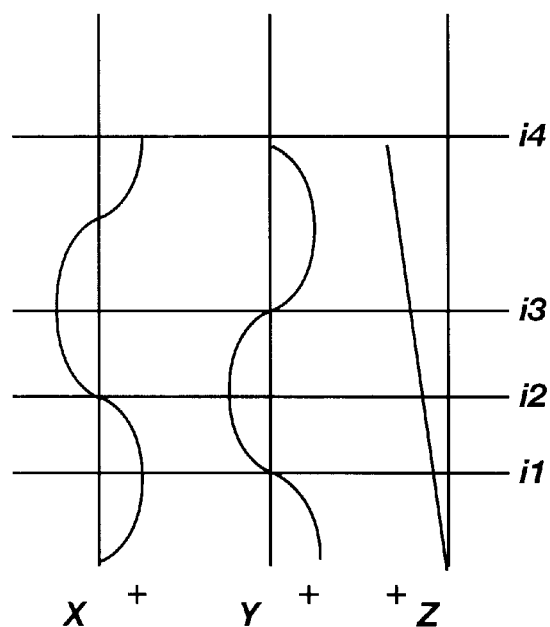
FIG. 18 is a view of the circular helix of FIG. 17, but seen using 3 parallel coordinates.

A more exotic feature than a line or a plane is a helix as shown in a classical orthogonal perspective in FIG. 17. Note that the helix 26 intersects the x-z plane first at i1, then it intersects the y-z plane at i2, then it intersects the x-z plane at i3, and finally intersects the x-z plane at i4. In contrast, FIG. 18 shows the helix 26, but in parallel coordinates utilizing the present invention. Note that the x and y projections of the helix 26 in orthogonal coordinates in FIG. 17 are the sine/cosine waves shown in 2 parallel coordinates in FIG. 18 (assuming that the helix in the 3 dimensional coordinates is a circle in the x-y planes). Thus, in 3 parallel coordinates, the value of z increases linearly as the helix progresses (again assuming that the helix in 3 orthogonal dimensions is a cylinder in the z direction).

Extrapolating these forms to create a spherical helix in 3 orthogonal dimensions (where the helix forms a sphere in these three dimensions rather than the cylindrical helix 26 shown in FIGS. 17 and 18. Extrapolating these definitions for multiple parallel coordinate dimensions would show what helices look like in many dimensions; seeing such shapes in orthogonal space is not intuitively obvious.

Therefore, when exploring mathematical spaces in many parallel dimensions visually, looking for trends and shapes, especially when structures that look like planes, valleys, or mountain ranges run diagonally across the terrain, it is possible to orient a user's view across these structures to determine their directions, shapes, and slopes, and then to curve-fit classical functions to these shapes (along such visual diagonals) to facilitate extrapolations and trends.

Practical application of the concepts of the present invention are significant. It should not be surprising that one of the most important applications involves real-time calculations which can benefit the safety of passengers within airplanes. Specifically, air traffic collision systems might be significantly improved to provide more accurate and/or earlier warning alerts of potential problems. This application in particular is one which benefits from being able to include time as a separate parallel coordinate. It then becomes only an issue of being able to recognize structure of the data sets within the visualization space which indicates that the flight path of two planes is going to intersect or come dangerously close to intersecting.

A very different application is applying the method of the present invention to enable optimization of sailboat parameters which influence speed. For example, analysis of the shape of a sail can bring together many factors (dimensions) which can all influence how the sail will perform. Furthermore, this analysis is not limited to the shape of the sail alone. The shape of the keel and the hull of the boat are also factors which can be optimized through analysis of multi-dimensional data sets.

The present invention can also be utilized in the analysis of manufacturing operating systems, medical treatment strategies, insurance risk factors, financial investment strategies, land-use, resource planning and industrial engineering. In other words, the possible uses of the present invention are not limited by the complexity of the data involved or the number of dependent or independent factors which influence the outcome.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for visualizing a plurality of non-orthogonal coordinate data points which are representative of multiple parameters which can be described relative to a spatial non-orthogonal data space coordinate system having at least three dimensions, said method comprising the steps of:

(1) generating a three dimensional visualization environment within a computer memory;

(2) modeling the spatial non-orthogonal data space coordinate system within the three dimensional visualization environment;

(3) mapping the plurality of non-orthogonal coordinate data points relative to the spatial non-orthogonal data space coordinate system;

(4) providing a point of observation into the three dimensional visualization environment, wherein the point of observation can be manipulated so as to be moved relative to the spatial non-orthogonal data space coordinate system and thereby view the plurality of non-orthogonal coordinate data points on the spatial non-orthogonal data space coordinate system from any location within the three dimensional visualization environment; and (5) moving the point of observation relative to the spatial non-orthogonal data space coordinate system to thereby facilitate recognition of a structure, pattern, trend, correlation or relationship between the plurality of non-orthogonal coordinate data points.

2. The method as defined in claim 1 wherein the step of modeling the spatial non-orthogonal data space coordinate system within the three dimensional visualization environment further comprises the step of modeling a parallel coordinate system, wherein the parallel coordinate system has at least three coordinate axes.

3. The method as defined in claim 2 wherein the step of modeling the parallel coordinate system further comprises the step of modeling a parallel coordinate system having coordinate axes which are reconfigurable to any desired orientation with respect to each other to thereby facilitate recognition of a structure, pattern, trend, correlation or relationship between the plurality of non-orthogonal coordinate data points, and which are generally not as recognizable utilizing an existing configuration of the coordinate axes.

4. The method as defined in claim 1 wherein the step of generating a three dimensional visualization environment within a computer memory further comprises the step of generating the three dimensional visualization environment within a memory space of a graphical browser, wherein the graphical browser is capable of displaying the spatial non-orthogonal data space coordinate system and the plurality of non-orthogonal coordinate data points which are mapped thereto.

5. The method as defined in claim 4 wherein the method further comprises the step of providing a plurality of input signals to the graphical browser to control movement of the plurality of non-orthogonal coordinate data points relative to the observation point.

6. The method as defined in claim 4 wherein the method further comprises the step of utilizing a virtual reality programming tool which is compatible with the graphical browser to model the spatial non-orthogonal data space coordinate system and the plurality of non-orthogonal coordinate data points.

7. The method as defined in claim 6 wherein the step of utilizing a virtual reality programming tool to model the spatial non-orthogonal data space coordinate system and the plurality of non-orthogonal coordinate data points further comprises the step of utilizing a Virtual Reality Programming Language (VRML).

8. The method as defined in claim 7 wherein the step of utilizing the VRML further comprises the step of utilizing a VRML plug-in module compatible with the graphical browser to thereby provide functionality of the VRML to the graphical browser for visualization of the plurality of non-orthogonal coordinate data points.

9. The method as defined in claim 1 wherein the method further comprises the step of providing a means for observation of the three dimensional visualization environment, wherein the means for observation corresponds to the point of observation.

10. The method as defined in claim 1 wherein the step of moving the point of observation relative to the spatial non-orthogonal data space coordinate system further comprises the step of providing movement in an infinite number of degrees of freedom relative to a present position of the point of observation within the three dimensional visualization environment.

11. The method as defined in claim 1 wherein the step of modeling the spatial non-orthogonal data space coordinate system within the three dimensional visualization environment further comprises disposing the spatial non-orthogonal data space coordinate system so as to provide three orthogonal coordinate axes at any arbitrarily determined location within the three dimensional visualization environment.

12. The method as defined in claim 1 wherein the step of mapping the plurality of non-orthogonal coordinate data points from a Data Space relative to the spatial non-orthogonal data space coordinate system in a Display Space further comprises the step of displaying the plurality of non-orthogonal coordinate data points in a vertical perspective relative to respective coordinate axes of the spatial non-orthogonal data space coordinate system, wherein each set of the plurality of non-orthogonal coordinate data points are separated uniformly along the respective coordinate axes by a constant space.

13. The method as defined in claim 1 wherein the step of mapping the plurality of non-orthogonal coordinate data points from a Data Space relative to the spatial non-orthogonal data space coordinate system in a Display Space further comprises the step of including or removing Display Space artifact to facilitate recognition of the structure, pattern, trend, correlation or relationship between the plurality of data points.

14. The method as defined in claim 13 wherein the step of modeling the spatial non-orthogonal data space coordinate system within the three dimensional visualization environment further comprises the step of assigning values to any Display Space artifact as a function of any selectable criteria from Data Space.

15. The method as defined in claim 1 wherein the method further comprises the steps of preparing the plurality of non-orthogonal coordinate data points for mapping onto the spatial non-orthogonal data space coordinate system by:

(1) organizing preliminary data in a data table, wherein the preliminary data is organized to represent how the plurality of non-orthogonal coordinate data points should be mapped onto the spatial non-orthogonal data space coordinate system;

(2) transforming the preliminary data into a file which is compatible with a programming language which is controlling the three dimensional visualization environment;

(3) inputting the file into the programming language; and (4) activating the programming language to thereby generate the three dimensional visualization environment, the spatial non-orthogonal data space coordinate system, and the plurality of non-orthogonal coordinate data points within the computer memory.

16. The method as defined in claim 1 wherein the step of moving the point of observation relative to the spatial non-orthogonal data space coordinate system further comprises the steps of:

(1) maintaining the spatial non-orthogonal data space coordinate system at a same position within the three dimensional visualization environment; and (2) moving the point of observation within the three dimensional visualization environment.

17. The method as defined in claim 1 wherein the step of moving the point of observation relative to the spatial non-orthogonal data space coordinate system further comprises the steps of:

(1) maintaining the point of observation at a same position within the three dimensional visualization environment; and (2) moving the spatial non-orthogonal data space coordinate system within the three dimensional visualization environment.

18. A system for creating an intellectual structure within a computer memory, such that the intellectual structure can be observed and manipulated to thereby recognize and observe characteristics and attributes thereof, said system comprising:

a means for generating a three dimensional visualization environment within the computer memory;

a means for modeling a spatial non-orthogonal data space coordinate system within the three dimensional visualization environment;

a means for generating the intellectual structure so as to be associated with the spatial non-orthogonal data space coordinate system of the three dimensional visualization environment; and a means for providing a point of observation into the three dimensional visualization environment, wherein the point of observation can be manipulated so as to be moved relative to the spatial non-orthogonal data space coordinate system so as to view the intellectual structure associated therewith from any location within the three dimensional visualization environment, and to thereby facilitate recognition of a structure, pattern, trend, correlation or relationship within the intellectual structure.

19. The system for creating an intellectual structure as defined in claim 18 wherein the means for generating a three dimensional visualization environment within the computer memory further comprises a graphical software program being executed on a general purpose computer.

20. The system for creating an intellectual structure as defined in claim 18 wherein the system further comprises a computer display associated with the computer memory to thereby enable the point of observation to be viewable thereon.

21. A method for utilizing a computer system to visualize data space which is representative of data having multiple parameters which can be described in a spatial non-orthogonal data space coordinate system having at least three dimensions, said method comprising the steps of:

(1) generating the three dimensional environment having the spatial non-orthogonal data space coordinate system, and which is stored within a computer memory;

(2) mapping the data space onto the spatial non-orthogonal data space coordinate system;

(3) providing a point of observation of the data space which is disposed within the three dimensional environment, wherein the point of observation can be manipulated so as to be moved relative to the spatial non-orthogonal data space coordinate system so as to view the data space on the spatial non-orthogonal data space coordinate system from any location within the three dimensional visualization environment; and (4) moving the point of observation relative to the spatial non-orthogonal data space coordinate system to thereby facilitate recognition of a structure, pattern, trend, correlation or relationship within the data space.

* * * * *